(12) United States Patent
Murakami (10) Patent No.: US 8,348,027 B2
(45) Date of Patent: Jan. 8, 2013

(54) DAMPING FORCE CONTROL TYPE SHOCK ABSORBER

(75) Inventor: Hiroshi Murakami, Yokohama (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 133 days.

(21) Appl. No.: 12/892,290

(22) Filed: Sep. 28, 2010

(65) Prior Publication Data

US 2011/0073424 A1 Mar. 31, 2011

(30) Foreign Application Priority Data

Sep. 30, 2009 (JP) ................................ 2009-228705

(51) Int. Cl.
*F16F 9/46* (2006.01)
(52) U.S. Cl. .................. 188/266.6; 188/266.5
(58) Field of Classification Search ............... 188/266.5, 188/266.6, 322.13, 318
See application file for complete search history.

(56) References Cited

U.S. PATENT DOCUMENTS

| | | | | |
|---|---|---|---|---|
| 6,079,526 A | * | 6/2000 | Nezu et al. ................. | 188/266.6 |
| 6,182,805 B1 | * | 2/2001 | Kashiwagi et al. ......... | 188/266.6 |
| 6,305,512 B1 | * | 10/2001 | Heinz et al. ................ | 188/299.1 |
| 7,743,896 B2 | * | 6/2010 | Vanhees et al. ........... | 188/322.13 |
| 7,770,983 B2 | * | 8/2010 | Park .......................... | 303/117.1 |
| 7,926,632 B2 | * | 4/2011 | Mangelschots et al. ... | 188/266.6 |
| 2009/0242339 A1 | * | 10/2009 | Nakadate et al. .......... | 188/266.5 |

FOREIGN PATENT DOCUMENTS

JP 2001-12534 1/2001

* cited by examiner

*Primary Examiner* — Christopher Schwartz
(74) *Attorney, Agent, or Firm* — Wenderoth, Lind & Ponack, LLP (57) ABSTRACT

The flow of hydraulic fluid induced by sliding movement of a piston in a cylinder is controlled by a pilot-type main valve and a pilot valve, which is a pressure control valve, thereby generating damping force. By thrust from a solenoid actuator, the valve-opening pressure of the pilot valve is controlled, and the pressure in a pilot chamber is also controlled to control the valve-opening pressure of the main valve. When there is a failure, a valve body of the pilot valve is retracted to abut against a fail-safe disk by spring force of a valve spring. Thus, damping force is generated by the fail-safe disk at the downstream side of the pilot valve, and the valve-opening pressure of the main valve is also controlled by the fail-safe disk to obtain an appropriate damping force.

9 Claims, 4 Drawing Sheets

Fig. 4 ent of the present invention.

DAMPING FORCE CONTROL TYPE SHOCK ABSORBER

BACKGROUND OF THE INVENTION

The present invention relates to a damping force control type shock absorber capable of controlling damping force.

Shock absorbers attached to suspension systems of automobiles or other vehicles include a damping force control type shock absorber designed to be capable of appropriately controlling damping force in accordance with road surface conditions, vehicle running conditions, etc. to improve ride quality and steering stability.

In general, the damping force control type shock absorber includes a cylinder having a fluid sealed therein. A piston connected with a piston rod is slidably fitted in the cylinder. A damping force control mechanism is provided in a passage through which the fluid flows in response to sliding movement of the piston in the cylinder. Japanese Patent Application Publication No. 2001-12534 discloses a damping force control mechanism that generates damping force by controlling the flow of fluid through a pilot-type damping valve and that further controls the damping force by controlling an actuator-driven control valve provided in a passage through which the pilot pressure is discharged.

The damping force control mechanism disclosed in Japanese Patent Application Publication No. 2001-12534 suffers, however, from the problem that the control valve is undesirably closed when the actuator is unenergized owing to a failure or the like, resulting in the damping force becoming excessively high.

SUMMARY OF THE INVENTION

An object of the present invention is to provide a damping force control type shock absorber having a simple structure and capable of obtaining an appropriate damping force even when an electric current is not applied to an actuator.

The present invention provides a damping force control type shock absorber including a cylinder having a fluid sealed therein, a piston slidably fitted in the cylinder, and a piston rod connected at one end thereof to the piston. The other end of the piston rod extends to the outside of the cylinder. The damping force control type shock absorber further includes a main valve generating damping force by controlling the flow of fluid induced by sliding movement of the piston in the cylinder, a pilot chamber applying the pressure therein to the main valve in a direction for closing the main valve, an inlet passage introducing the fluid into the pilot chamber, a pilot passage communicating between the pilot chamber and the downstream side of the main valve, and a control valve provided in the pilot passage. The control valve has a valve body urged by an urging member in a direction for opening the control valve, and an actuator moving the valve body in a direction for closing the control valve by thrust from a solenoid. A fail-safe valve is provided in the pilot passage at the downstream side of the control valve. The fail-safe valve abuts against the valve body to close the pilot passage when the valve body urged by the urging member moves in the direction for opening the control valve. The fail-safe valve separates from the valve body to open the pilot passage when the pressure in the pilot chamber reaches a predetermined pressure.

DETAILED DESCRIPTION OF THE INVENTION

Embodiments of the present invention will be explained below in detail with reference to the accompanying drawings.

A first embodiment of the present invention will be explained with reference to FIGS. 1 and 2.

Figure 2:
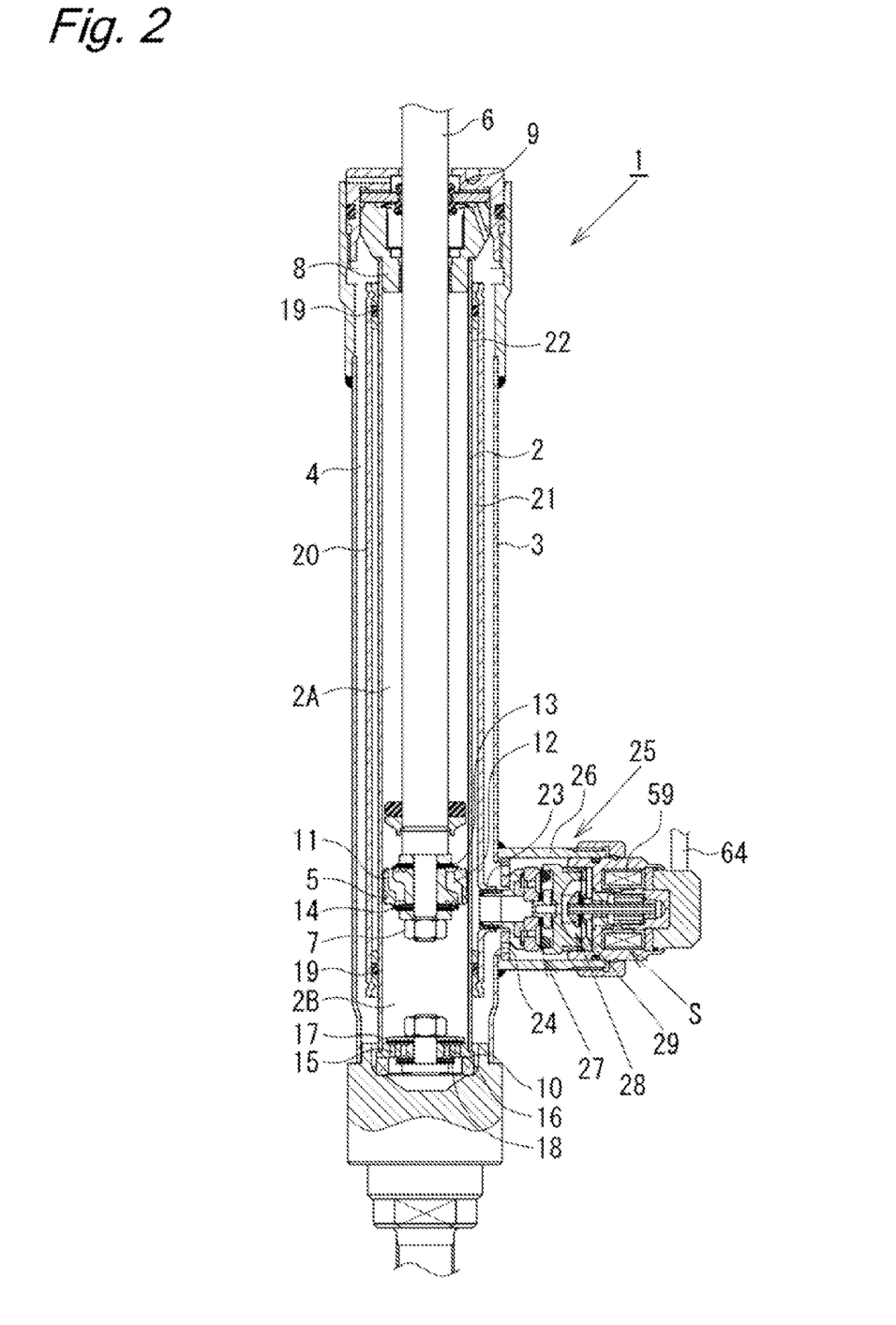
FIG. 2 is a longitudinal sectional view of the damping force control type shock absorber according to the first embodiment of the present invention.

As shown in FIG. 2, a damping force control type shock absorber 1 according to this embodiment has a dual-tube structure comprising a cylinder 2 and an outer tube 3 provided outside the cylinder 2. A reservoir 4 is formed between the cylinder 2 and the outer tube 3. A piston 5 is slidably fitted in the cylinder 2. The piston 5 divides the interior of the cylinder 2 into two chambers, i.e. a cylinder upper chamber 2A and a cylinder lower chamber 2B. The piston 5 is connected with one end of a piston rod 6 by a nut 7. The other end portion of the piston rod 6 extends through the cylinder upper chamber 2A and further through a rod guide 8 and an oil seal 9, which are fitted to the upper end portion of the double-tube structure comprising the cylinder 2 and the outer tube 3, and projects to the outside of the cylinder 2. A base valve 10 is provided in the lower end portion of the cylinder 2 to divide the cylinder lower chamber 2B and the reservoir 4 from each other.

The piston 5 is provided with passages 11 and 12 for communication between the cylinder upper and lower chambers 2A and 2B. The passage 12 is provided with a check valve 13 allowing only the flow of fluid from the cylinder lower chamber 2B toward the cylinder upper chamber 2A. The passage 11 is provided with a disk valve 14 opening when the pressure of fluid in the cylinder upper chamber 2A reaches a predetermined pressure to relieve the fluid pressure to the cylinder lower chamber 2B.

The base valve 10 is provided with passages 15 and 16 for communication between the cylinder lower chamber 2B and the reservoir 4. The passage 15 is provided with a check valve 17 allowing only the flow of fluid from the reservoir 4 toward the cylinder lower chamber 2B. The passage 16 is provided with a disk valve 18 opening when the pressure of fluid in the cylinder lower chamber 2B reaches a predetermined pressure to relieve the fluid pressure to the reservoir 4. As a hydraulic fluid, a hydraulic oil is sealed in the cylinder 2, and the hydraulic oil and a gas are sealed in the reservoir 4.

The cylinder 2 has a separator tube 20 fitted thereover with seal members 19 interposed therebetween at the upper and lower ends of the cylinder 2. Thus, an annular passage 21 is formed between the cylinder 2 and the separator tube 20. The annular passage 21 is communicated with the cylinder upper chamber 2A through a passage 22 provided in a side wall of the cylinder 2 near the upper end thereof. The separator tube 20 has a small-diameter opening 23 projecting from a lower part of the side wall thereof. The side wall of the outer tube 3 is provided with a large-diameter opening 24 in substantially concentric relation to the opening 23. A damping force generating mechanism 25 is attached to the opening 24 of the side wall of the outer tube 3.

Next, the damping force generating mechanism 25 will be explained with reference mainly to FIG. 1.

Figure 1:
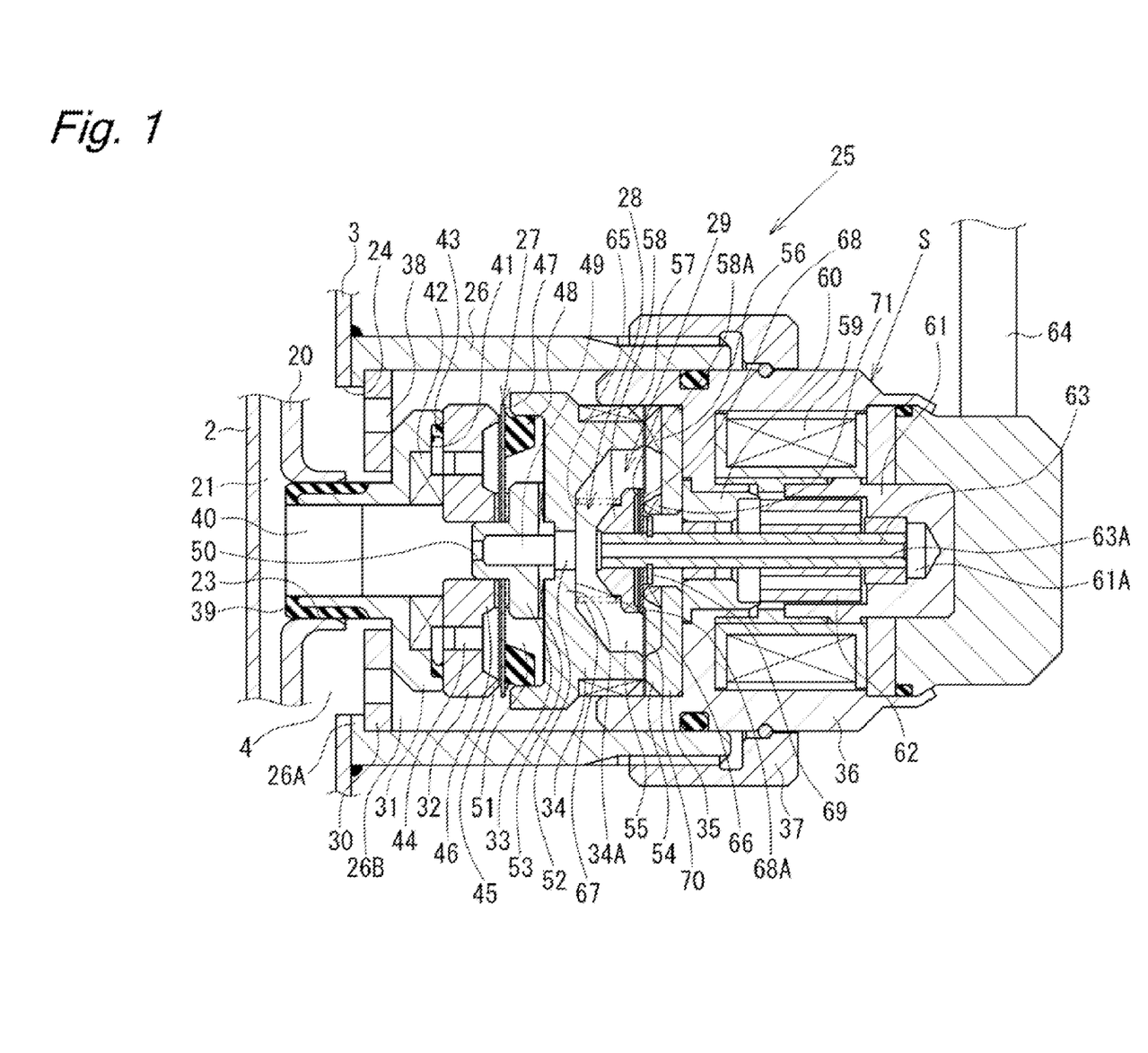
FIG. 1 is an enlarged longitudinal sectional view of a damping force generating mechanism, which is a main part of a damping force control type shock absorber according to a first embodiment of the present invention.

As shown in FIG. 1, the damping force generating mechanism 25 has a circular cylindrical casing 26 attached to the opening 24 of the outer tube 3. The casing 26 is provided therein with a pilot-type (back-pressure type) main valve 27 and a pilot valve 28, which is a solenoid-driven pressure control valve controlling the valve-opening pressure of the main valve 27. The damping force generating mechanism 25 further has a fail-safe valve 29 provided downstream of the pilot valve 28. The fail-safe valve 29 operates when there is a failure.

The casing 26 contains, in order from the opening 24 side thereof, an annular passage plate 30, a convex passage member 31, an annular main valve member 32, a convex orifice passage member 33, a circular cylindrical pilot valve member 34 having a bottom in the middle thereof, an annular retaining member 35, and a circular cylindrical solenoid casing 36. These members are disposed to abut against one another and secured by connecting the solenoid casing 36 to the casing 26 by a nut 37.

The passage plate 30 is secured by abutting against an inner flange 26A formed on the end portion of the casing 26. The passage plate 30 has a plurality of passages 38 axially extending therethrough to communicate between the reservoir 4 and a chamber 26B in the casing 26. The passage member 31 is secured with a small-diameter distal end portion thereof extending through the passage plate 30 and with a shoulder of a large-diameter portion thereof abutting against the passage plate 30. The distal end portion of the passage member 31 is fluid-tightly fitted to the opening 23 of the separator tube 20 through a seal member 39, whereby a passage 40 axially extending through the passage member 31 is in communication with the annular passage 21. The passage member 31 has an annular groove 41 formed on the end of the large-diameter portion thereof. The annular groove 41 is in communication with the passage 40 through a radial cut portion 42.

The main valve member 32 is secured with one end portion thereof abutting against the large-diameter portion of the passage member 31. The area of abutting contact between the main valve member 32 and the passage member 31 is sealed with a seal member 43 provided in the annular groove 41. The main valve member 32 is provided with a plurality of circumferentially spaced passages 44 axially extending therethrough. The passages 44 communicate with the annular groove 41 of the passage member 31. The other end of the main valve member 32 has an annular seat portion 45 projecting at the outer periphery of the openings of the passages 44 and further has an annular clamp portion 46 projecting at the inner periphery of the openings of the passages 44.

The outer peripheral portion of a disk valve 47 constituting the main valve 27 seats on the seat portion 45 of the main valve member 32. The inner peripheral portion of the disk valve 47 is clamped between the clamp portion 46 and a shoulder of a large-diameter portion of the orifice passage member 33. An annular sliding seal member 48 is secured to the outer peripheral portion of the rear side of the disk valve 47. The convex orifice passage member 33 is secured with a small-diameter portion thereof inserted into an opening in the center of the main valve member 32 and with the shoulder of the large-diameter portion thereof abutting against the disk valve 47. The orifice passage member 33 has a passage 49 axially extending therethrough. The passage 49 is in communication with the passage 40 of the passage member 31 through a fixed orifice 50 formed in the distal end portion of the small-diameter portion of the orifice passage member 33.

The pilot valve member 34 has a substantially circular cylindrical configuration having a bottom 34A in the middle thereof and is secured with one end of the bottom 34A abutting against the orifice passage member 33. The sliding seal member 48 of the disk valve 47 is slidably and fluid-tightly fitted to the inner peripheral surface of a circular cylindrical portion at one end of the pilot valve member 34 to form a pilot chamber 51 at the back of the disk valve 47. The disk valve 47 opens upon receiving the pressure in the passage 44 to communicate the passages 44 with the chamber 26B in the casing 26, which is downstream of the passage 44. The pressure in the pilot chamber 51 acts on the disk valve 47 in the direction for closing the disk valve 47. The pilot valve member 34 has a port 52 extending through the center of the bottom 34A. The port 52 is in communication with the passage 49 of the orifice passage member 33. The pilot chamber 51 is in communication with the passage 49 through a cut portion 53. The cut portion 53 is formed in a part of the orifice passage member 33 that abuts on the bottom 34A of the pilot valve member 34. The cut portion 53, the passage 49 and the fixed orifice 50 constitute in combination an inlet passage for introducing the hydraulic oil into the pilot chamber 51.

The retaining member 35 has an annular projection 54 formed on the outer periphery of one end thereof. The annular projection 54 is secured by abutting against the end of a circular cylindrical portion of the other end of the pilot valve member 34, thereby forming a valve chamber 55 inside the cylindrical portion of the pilot valve member 34. The pilot valve member 34 and the retaining member 35 are radially positioned by fitting a circular cylindrical portion of the solenoid casing 36, which is fitted in the casing 26, to the outer peripheral portion of the retaining member 35. The valve chamber 55 is in communication with the chamber 26B in the casing 26 through a cut portion 56 formed in the annular projection 54 of the retaining member 35, a cut portion (not shown) circumferentially partially formed in a fail-safe disk 70, and a cut portion 57 formed in the outer periphery of the cylindrical portion of the pilot valve member 34. The port 52, the valve chamber 55 and the cut portions 56 and 57 constitute in combination a pilot passage communicating the pilot chamber 51 with the chamber 26B downstream of the disk valve 47 (main valve 27). The valve chamber 55 is provided therein with a valve body 58 of the pilot valve 28, which is a pressure control valve for selectively opening and closing the port 52.

The solenoid casing 36 contains a coil 59, cores 60 and 61 inserted in the coil 59, a plunger 62 guided by the cores 60 and 61, and a hollow actuating rod 63 connected to the plunger 62. These members incorporated in the solenoid casing 36 constitute a solenoid actuator S. The distal end portion of the actuating rod 63 extends through the retaining member 35 and is connected to the valve body 58 in the valve chamber 55. When the coil 59 is supplied with an electric current through a lead wire 64, axial thrust is generated in the plunger 62 according to the supplied electric current.

The valve body 58 has an annular seat portion 65 formed on a tapered distal end portion thereof that faces the port 52 of the pilot valve member 34. The seat portion 65 selectively unseats from and seats on a seat surface 66 around the port 52, thereby opening and closing the port 52. The valve body 58 is urged by the spring force of a valve spring 67 (compression coil spring), which is an urging member interposed between the valve body 58 and the bottom 34A of the pilot valve member 34. Thus, the valve body 58 is normally in a retract position shown in FIG. 1, i.e. a valve open position. Meanwhile, when the coil 59 is energized, thrust is generated in the plunger 62, causing the valve body 58 to advance against the spring force of the valve spring 67. As a result, the seat portion 65 seats on the seat surface 66 to close the port 52. The pressure in the port 52, i.e. in the pilot chamber 51, is controlled by controlling the valve-opening pressure of the valve body 58 with respect to the port 52 through the thrust of the plunger 62, i.e. the electric current supplied to the coil 59.

The valve body 58 has a hollow actuating rod 63 extending therethrough. When the valve body 58 is in a valve closing position, i.e. when the seat portion 65 seats on the seat surface 66, a passage 63A in the actuating rod 63 opens into the port 52 to provide communication between the port 52 and a chamber 61A in the core 61 at the back of the actuating rod 63. Consequently, the pressure-receiving area of the valve body 58 where the hydraulic oil passing through the port 52 acts on the valve body 58 reduces to allow an increase in the variable width of the valve-opening pressure of the valve body 58 with respect to the thrust of the plunger 62. It is necessary, in order to enlarge the damping force variable width with the solenoid thrust remaining the same, to reduce the pressure-receiving area of the valve body 58, or to enlarge the diameter of the port 52 with a view to reducing soft damping force. In this embodiment, the port 52 is communicated with the chamber 61A in the core 61 at the back of the actuating rod 63 through the passage 63A in order to apparently reduce the pressure-receiving area of the valve body 58. On the other hand, the diameter of the port 52 is increased, and the area over which the valve body 58 faces the port 52 is increased. Therefore, it is also possible to reduce soft damping force. As a result, the damping force variable width can be enlarged with the solenoid thrust remaining the same.

The following is an explanation of the fail-safe valve 29, i.e. a combination of an orifice 68A and a fail-safe disk 70.

The valve body 58 has an annular seat portion 58A projecting from the outer periphery of the rear end surface thereof. At least one annular seat disk 68, i.e. either one seat disk 68 or a plurality of stacked annular seat disks 68, abuts against the seat portion 58A. The seat disk 68 is secured to the valve body 58 with the inner peripheral portion thereof abutting against a snap ring 69 attached to the actuating rod 63. An annular fail-safe disk 70 is clamped at the outer peripheral portion thereof between the end of the cylindrical portion of the pilot valve member 34 and the annular projection 54 of the retaining member 35. The outer, peripheral edge portion of the seat disk 68 secured to the valve body 58 selectively unseats from and seats on the inner peripheral edge portion of the fail-safe disk 70, thereby opening and closing the flow path between the port 52 and the cut portion 56 in the valve chamber 55.

Either the outer peripheral edge portion of the seat disk 68 or the inner peripheral edge portion of the fail-safe disk 70 is provided with an orifice (cut portion) 68A constantly providing communication between the port 52 and the cut portion 56. The retaining member 35 has a stopper 71 projecting therefrom to abut against the seat disk 68 to limit the retract position of the valve body 58. It should be noted that the stopper for limiting the retract position of the valve body 58 may be provided at other part. The retract position of the valve body 58 may be limited by abutment between the plunger 62 and the core 61.

When the coil 59 is unenergized, the valve body 58 is retracted by the spring force of the valve spring 67 and, as shown in FIG. 1, the seat disk 68 abuts against the fail-safe disk 70 to close the flow path between the port 52 and the cut portion 56 in the valve chamber 55. If, in this state, the pressure of fluid at the port 52 side in the valve chamber 55 rises to reach a predetermined pressure, the fail-safe disk 70 deflects and separates from the seat disk 68 after the retract position of the valve body 58 has been limited by the stopper 71, thus opening the flow path between the port 52 and the cut portion 56. When the valve body 58 abuts against the stopper 71, the seat disk 68 is in abutting contact with the fail-safe disk 70. If, in this state, the pressure in the valve chamber 55 rises, the fail-safe disk 70 deflects to separate from the seat disk 68, thereby allowing the fluid in the valve chamber 55 to flow into the downstream-side chamber 26B through the cut portions 56 and 57.

On the other hand, when the coil 59 is energized, the seat portion 65 of the valve body 58 is seated on the seat surface 66 to execute pressure control by the pilot valve 28, as stated above. In this state, the seat disk 68 separates from the fail-safe disk 70, and the valve chamber 55 and the cut portion 56 are communicated with each other through the opening in the center of the fail-safe disk 70.

The following is an explanation of the operation of this embodiment arranged as stated above.

The damping force control type shock absorber 1 is installed between sprung and unsprung members of a suspension system of a vehicle. The lead wire 64 is connected to an in-vehicle controller or the like. In a normal operating state, the coil 59 is energized to seat the seat portion 65 of the valve body 58 on the seat surface 66 to execute pressure control by the pilot valve 28.

During the extension stroke of the piston rod 6, the movement of the piston 5 in the cylinder 2 closes the check valve 13 of the piston 5. Thus, before the disk valve 14 opens, the fluid in the cylinder upper chamber 2A is pressurized to flow through the passage 22 and the annular passage 21 into the passage 40 of the passage member 31 of the damping force generating mechanism 25 from the opening 23 of the separator tube 20.

At this time, an amount of fluid corresponding to the amount of movement of the piston 5 flows into the cylinder lower chamber 2B from the reservoir 4 by opening the check valve 17 of the base valve 10. It should be noted that when the pressure in the cylinder upper chamber 2A reaches the valve-opening pressure of the disk valve 14 of the piston 5, the disk valve 14 opens to relieve the pressure in the cylinder upper chamber 2A into the cylinder lower chamber 2B, thereby preventing an excessive rise in pressure in the cylinder upper chamber 2A.

In the damping force generating mechanism 25, the fluid from the passage 40 of the passage member 31 flows as follows. Before the disk valve 47 of the main valve 27 opens (in the low piston speed region), the fluid flows through the fixed orifice 50 and the passage 49 of the orifice passage member 33 and the port 52 of the pilot valve member 34 and pushes open the valve body 58 of the pilot valve 28 to flow into the valve chamber 55. At this time, the valve body 58 of the pilot valve 28 does not abut against the stopper 71. The fluid flowing into the valve chamber 55 further passes through the opening of the fail-safe disk 70 (i.e. a round hole formed in the center of the fail-safe disk 70) and flows into the reservoir 4 through the cut portion 56 of the retaining member 35, the cut portion (not shown) circumferentially partially formed in the fail-safe disk 70, the cut portion 57 of the pilot valve member 34, the chamber 26B in the casing 26 and the passages 38 of the passage plate 30. When the piston speed increases and the pressure in the cylinder upper chamber 2A reaches the valve-opening pressure of the disk valve 47, the fluid flowing into the passage 40 passes through the cut portion 42, the annular groove 41 and the passages 44 and pushes open the disk valve 47 to flow directly into the chamber 26B in the casing 26.

During the compression stroke of the piston rod 6, the movement of the piston 5 in the cylinder 2 opens the check valve 13 of the piston 5 and closes the check valve 17 for the passage 15 of the base valve 10. Thus, before the disk valve 18 opens, the fluid in the cylinder lower chamber 2B flows into the cylinder upper chamber 2A, and an amount of fluid corresponding to the amount by which the piston rod 6 enters the cylinder 2 flows from the cylinder upper chamber 2A into the reservoir 4 through a flow path similar to that during the above-described extension stroke. It should be noted that when the pressure in the cylinder lower chamber 2B reaches the valve-opening pressure of the disk valve 18 of the base valve 10, the disk valve 18 opens to relieve the pressure in the cylinder lower chamber 2B into the reservoir 4, thereby preventing an excessive rise in pressure in the cylinder lower chamber 2B.

Thus, during both the extension and compression strokes of the piston rod 6, before the disk valve 47 of the main valve 27 opens (in the low piston speed region) in the damping force generating mechanism 25, damping force is generated by the fixed orifice 50 and the valve-opening pressure of the valve body 58 of the pilot valve 28. After the disk valve 47 has opened (in the high piston speed region), damping force is generated according to the degree of opening of the disk valve 47. The damping force can be controlled directly, independently of the piston speed, by controlling the valve-opening pressure of the pilot valve 28 by the electric current supplied to the coil 59. In this regard, variation in the valve-opening pressure of the pilot valve 28 causes a change in the pressure in the pilot chamber 51 communicating with the passage 49 at the upstream side of the pilot valve 28, and the pressure in the pilot chamber 51 acts in the direction for closing the disk valve 47. Therefore, by controlling the valve-opening pressure of the pilot valve 28, the valve-opening pressure of the disk valve 47 can be controlled simultaneously, and hence the control range for damping force characteristics can be widened.

In this regard, when the electric current supplied to the coil 59 is reduced to reduce the thrust of the plunger 62, the valve-opening pressure of the pilot valve 28 lowers, and soft damping force is generated. When the electric current supplied to the coil 59 is increased to increase the thrust of the plunger 62, the valve-opening pressure of the pilot valve 28 rises, and hard damping force is generated. Accordingly, soft damping force, which is generally used frequently, can be generated with a reduced electric current, and the power consumption can be reduced.

In a case where the thrust of the plunger 62 is lost owing to a failure such as disconnection of the coil 59, a trouble in the in-vehicle controller, etc., the valve body 58 is retracted to the position shown in FIG. 1 by the spring force of the valve spring 67. As a result, the port 52 opens, and the seat disk 68 of the valve body 58 abuts against the fail-safe disk 70 to close the flow path between the port 52 and the cut portion 56 in the valve chamber 55. In this state, the flow of fluid in the valve chamber 55 from the port 52 to the cut portion 56 is controlled by the fail-safe valve 29, i.e. the orifice 68A and the fail-safe disk 70. Therefore, it is possible to generate a desired damping force and to control the pressure in the pilot chamber 51, i.e. the valve-opening pressure of the main valve 27, by setting the flow path area of the orifice 68A and the valve-opening pressure of the fail-safe disk 70. Consequently, an appropriate damping force can be obtained even when there is a failure.

Thus, the passage for fluid when the coil 59 is energized and the fluid passage when there is a failure are made common to each other (serialized). Accordingly, the structure can be simplified, and the space efficiency can be increased. Further, the fail-safe disk 70 is a disk valve, and the passage for fluid when there is a failure is selectively opened and closed by the disk valve and the end of the valve body. Therefore, productivity and assembleability can be increased in comparison to the arrangement using a ball valve, for example. In addition, soft damping force, which is generally used frequently, can be generated by supplying a reduced electric current to the coil 59. Accordingly, the power consumption can be reduced. When the coil 59 is unenergized, the fail-safe valve 29 provides an appropriate damping force larger than the soft damping force. Therefore, the steering stability of the vehicle can be ensured, and the fail-safe scheme can be realized. It is also possible to prevent adverse effects, e.g. an increase in vibrations input to the vehicle body due to the fact that the damping force characteristic is fixed to the hard damping force characteristic side.

Next, a second embodiment of the present invention will be explained with reference to FIG. 3. It should be noted that members or portions of the second embodiment similar to those of the first embodiment are denoted by the same reference numerals as used in the first embodiment, and only a point in which the second embodiment differs from the first embodiment will be explained in detail.

Figure 3:
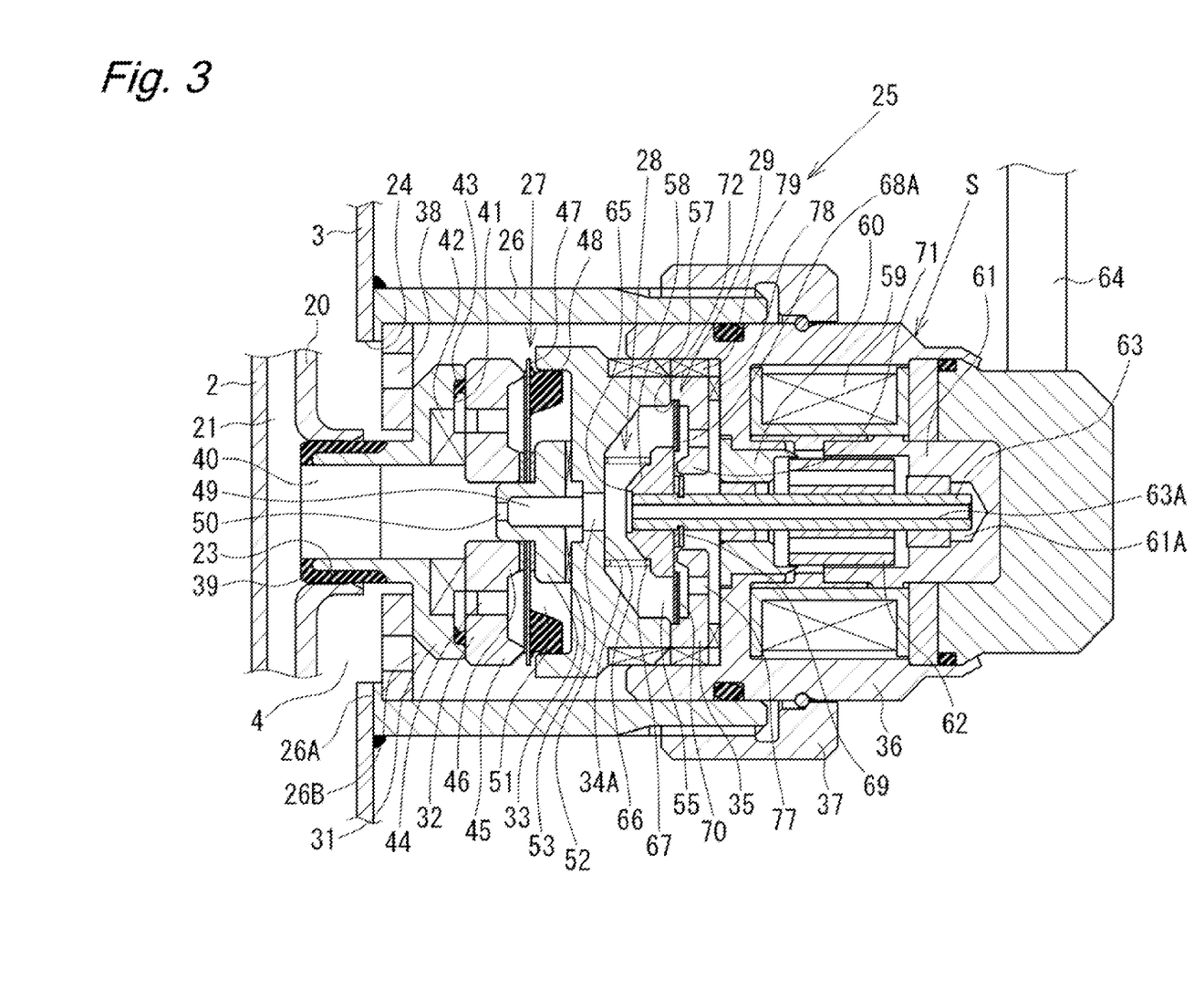
FIG. 3 is an enlarged longitudinal sectional view of a damping force generating mechanism, which is a main part of a damping force control type shock absorber according to a second embodiment of the present invention.

In this embodiment, as shown in FIG. 3, the outer peripheral portion of the fail-safe disk 70 of the fail-safe valve 29 is not clamped but inserted into an inner peripheral groove 72 formed by the retaining member 35 and the pilot valve member 34, thereby being floatingly supported so as to be axially movable by a predetermined distance. The annular projection 54 of the valve body 58 and the seat disk 68 are omitted. Instead, the outer peripheral edge portion of the end surface of the valve body 58 abuts directly against the inner peripheral edge portion of the fail-safe disk 70. It should be noted that the orifice 68A may be provided in the inner peripheral edge portion of the fail-safe disk 70 or in the outer peripheral edge portion of the end surface of the valve body 58. The valve chamber 55 is in communication with the chamber 26B in the casing 26 through a passage 77 axially extending through the retaining member 35, a cut portion 78 formed in the end portion of the retaining member 35, a cut portion 79 formed in the outer peripheral portion of the retaining member 35, and the cut portion 57 of the pilot valve member 34. Thus, the second embodiment can offer the same advantageous effects as those of the above-described first embodiment. In addition, the second embodiment can increase durability.

Next, a third embodiment of the present invention will be explained with reference to FIG. 4. It should be noted that members or portions of the third embodiment similar to those of the first embodiment are denoted by the same reference numerals as used in the first embodiment, and only a point in which the third embodiment differs from the first embodiment will be explained in detail.

Figure 4:
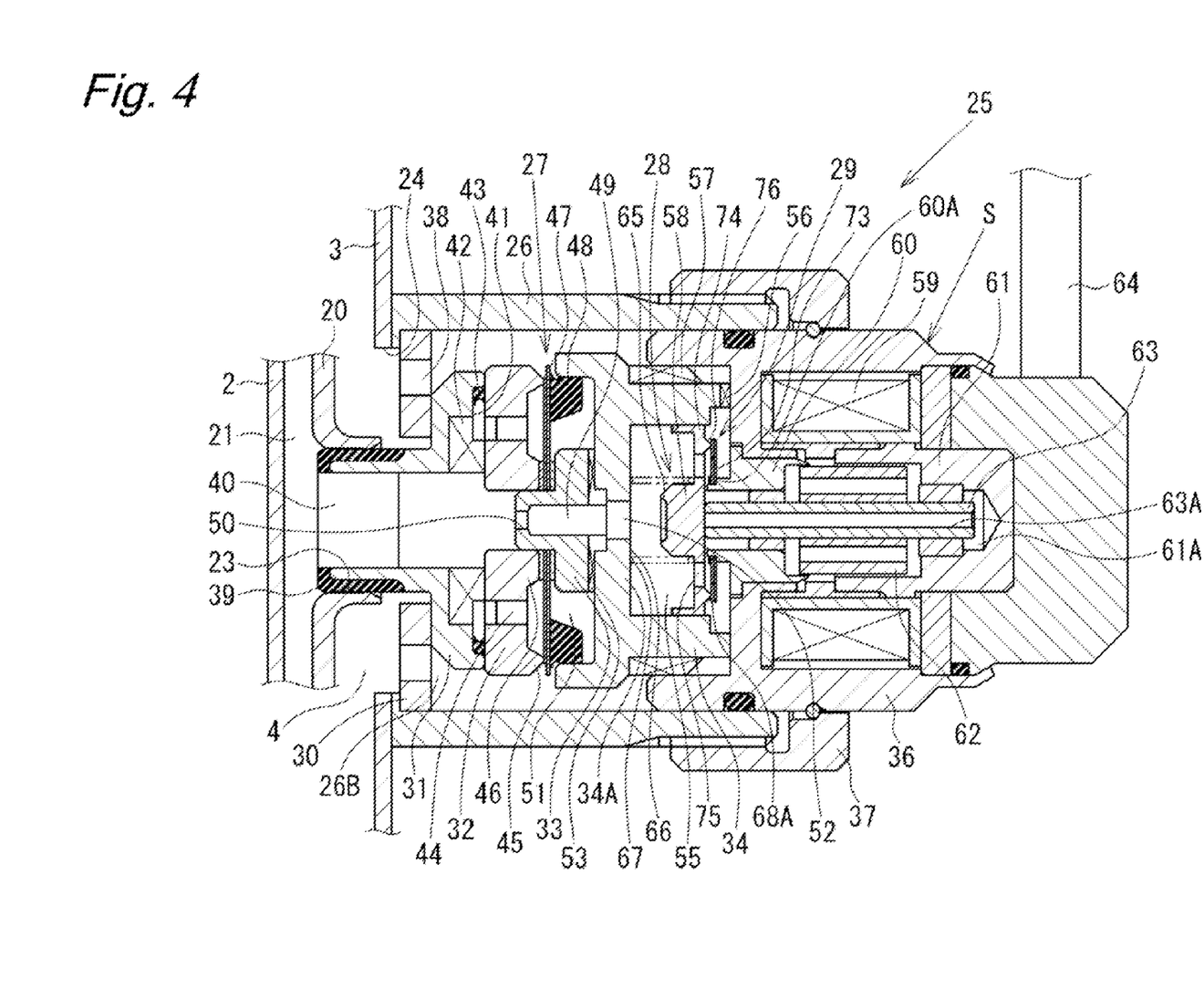
FIG. 4 is an enlarged longitudinal sectional view of a damping force generating mechanism, which is a main part of a damping force control type shock absorber according to a third embodiment of the present invention.

In this embodiment, as shown in FIG. 4, the retaining member 35 is omitted. Instead, the solenoid casing 36 abuts against the end of the cylindrical portion of the pilot valve member 34, and the cut portion 56 communicating with the valve chamber 55 is formed in the end of the cylindrical portion of the pilot valve member 34. A fail-safe disk 73 constituting the fail-safe valve 29 is secured at the inner peripheral portion thereof to a circular cylindrical portion 60A projecting from the core 60, so that the outer peripheral portion of the fail-safe disk 73 is deflectable. The cylindrical portion 60A serves also as a stopper. The valve body 58 of the pilot valve 28 has an enlarged-diameter portion 74 formed at the proximal end thereof. The outer periphery of the enlarged-diameter portion 74 is in slidable contact with the inner peripheral surface of the cylindrical portion of the pilot valve member 34 and thus guided. The enlarged-diameter portion 74 has a plurality of passages 75 axially extending therethrough to face the fail-safe disk 73. An annular seat portion 76 projects at the outer periphery of the openings of the passages 75. The fail-safe disk 73 seats on the seat portion 76. The orifice 68A may be formed in the outer peripheral portion of the fail-safe disk 73 or in the seat portion 76.

With the above-described arrangement, in the valve chamber 55, the fluid flows into the cut portion 56 through the passages 75 in the enlarged-diameter portion 74 of the valve body 58. When there is a failure, as shown in FIG. 4, the seat portion 76 of the enlarged-diameter portion 74 of the valve body 58 abuts against the fail-safe disk 73 to close the passages 75. The valve body 58 is retracted by the pressure of fluid at the port 52 side in the valve chamber 55 to abut against the cylindrical portion 60A as a stopper. Thereafter, the fail-safe disk 73 deflects to separate from the seat portion 76, thereby opening the passages 75. Thus, the third embodiment can offer the same advantageous effects as those of the above-described first embodiment.

Operations taking place when there is a failure will be explained more specifically in sequence. First, the valve body 58 is retracted to the position shown in the figure by the spring force of the valve spring 67. At the same time, the port 52 opens, and the seat disk 68 of the valve body 58 abuts against the fail-safe disk 70 to close the flow path between the port 52 and the cut portion 56 in the valve chamber 55. Thereafter, when the pressure in the valve chamber 55 increases to reach the valve-opening pressure of the fail-safe disk 70, the fail-safe disk 70 deflects to allow the fluid in the valve chamber 55 to flow to the downstream side through the cut portion 56. Thus, when there is a failure, it is possible to generate a medium damping force, which is between soft and hard damping forces.

Although the foregoing first to third embodiments use a hydraulic oil and a gas as hydraulic fluids from the viewpoint of operation stability and convenience for handling, the present invention is not limited thereto but can use other fluids alone or in combination. Although the sectional configurations of constituent elements such as the piston, the cylinder, and the valves are desirably circular in view of sealability, machinability, etc., the constituent elements may have polygonal or other sectional configurations.

Although in the first to third embodiments the damping force generating mechanism 25 is provided at the side of the cylinder, the damping force generating mechanism 25 may be provided in any place where a flow of hydraulic fluid is induced by sliding movement of the piston, for example, in the piston part.

Although in the first to third embodiments the pilot valve 28 is a pressure control valve, it may be a flow control valve, which controls the flow rate of fluid.

Although in the first to third embodiments the pilot chamber 51 and the valve chamber 55 are two separate chambers connected to each other by the cut portion 53, the pilot chamber 51 and the valve chamber 55 may be integrated into one common chamber, and the cut portion 53 may be eliminated.

In the first to third embodiments, one end of the valve body 58, which is in the form of one block, functions as a valving portion of a control valve, and the other end of the valve body 58 functions as a valve seat of a fail-safe valve.

The present invention, however, is not limited thereto. The valving portion of the control valve and the valve seat of the fail-safe valve may be formed by two discrete elements that are connected together in use, although the structure becomes complicated.

The damping force control type shock absorber according to the present invention allows an appropriate damping force to be obtained even when the supply of electric current to the control system is cut off owing to a failure or the like.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2009-228705 filed on Sep. 30, 2009.

The entire disclosure of Japanese Patent Application No. 2009-228705 filed on Sep. 30, 2009 including specification, claims, drawings and summary is incorporated herein by reference in its entirety.

What is claimed is:

1. A damping force control type shock absorber comprising:
    a cylinder having a fluid sealed therein;
    a piston slidably fitted in the cylinder;
    a piston rod connected at one end thereof to the piston, an other end of the piston rod extending to an outside of the cylinder;
    a main valve adapted to generate damping force by controlling a flow of fluid induced by sliding movement of the piston in the cylinder;
    a pilot chamber adapted to apply a pressure therein to the main valve in a direction for closing the main valve;
    an inlet passage adapted to introduce the fluid into the pilot chamber;
    a pilot passage adapted to communicate between the pilot chamber and a downstream side of the main valve;
    a control valve provided in the pilot passage to open and close the pilot passage, the control valve having a valve body urged by an urging member in a direction for opening the pilot passage, and an actuator adapted to move the valve body in a direction for closing the pilot passage by thrust from a solenoid; and
    a fail-safe valve provided in the pilot passage at a downstream side of the valve body, the fail-safe valve comprising an annular disk valve having an outer peripheral portion that is capable of being restrained,
    the fail-safe valve adapted to close the pilot passage by the valve body abutting against an inner peripheral portion of the fail-safe valve, when the valve body is urged by the urging member and moves in the direction for opening the pilot passage,
    the inner peripheral portion of the fail-safe valve adapted to be spaced apart from the valve body to open the pilot passage when the pressure in the pilot chamber reaches a predetermined pressure.

2. The damping force control type shock absorber of claim 1, wherein an orifice is formed in at least one of the fail-safe valve and the valve body abuttable against the fail-safe valve.

3. The damping force control type shock absorber of claim 2, wherein the control valve is a pressure control valve opening when the pressure in the pilot passage reaches a predetermined pressure.

4. The damping force control type shock absorber of claim 2, wherein the valve body of the control valve is provided in a valve chamber, the valve chamber opening at one end thereof into the pilot chamber, an other end of the valve chamber opening downstream of the fail-safe valve.

5. The damping force control type shock absorber of claim 1, wherein the valve body of the control valve is provided in a valve chamber, the valve chamber opening at one end thereof into the pilot chamber, an other end of the valve chamber opening downstream of the fail-safe valve.

6. The damping force control type shock absorber of claim 5, wherein one end of the valve chamber is selectively opened and closed by one end of the valve body, an other end of the valve chamber being selectively opened and closed by both the fail-safe valve and an other end of the valve body.

7. The damping force control type shock absorber of claim 1, wherein the control valve is a pressure control valve opening when the pressure in the pilot passage reaches a predetermined pressure.

8. The damping force control type shock absorber of claim 7, wherein the valve body of the control valve is provided in a valve chamber, the valve chamber opening at one end thereof into the pilot chamber, an other end of the valve chamber opening downstream of the fail-safe valve.

9. The damping force control type shock absorber of claim 1, wherein the other end of the valve body is provided with an annular seat portion abuttable against the fail-safe valve.

* * * * *